(12) United States Patent
Kim et al.

(10) Patent No.: US 10,944,608 B2
(45) Date of Patent: Mar. 9, 2021

(54) METHOD FOR TRANSMITTING AND RECEIVING CONTROL CHANNEL IN WIRELESS COMMUNICATION SYSTEM AND DEVICE FOR SUPPORTING SAME

(71) Applicant: LG ELECTRONICS INC., Seoul (KR)

(72) Inventors: Kijun Kim, Seoul (KR); Eunsun Kim, Seoul (KR); Suckchel Yang, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 16/081,385

(22) PCT Filed: Feb. 6, 2017

(86) PCT No.: PCT/KR2017/001255
§ 371 (c)(1),
(2) Date: Aug. 30, 2018

(87) PCT Pub. No.: WO2017/150813
PCT Pub. Date: Sep. 8, 2017

(65) Prior Publication Data
US 2019/0081841 A1 Mar. 14, 2019

Related U.S. Application Data

(60) Provisional application No. 62/302,764, filed on Mar. 2, 2016.

(51) Int. Cl.
*H04L 27/26* (2006.01)
*H04L 5/00* (2006.01)
*H04W 72/04* (2009.01)

(52) U.S. Cl.
CPC ........ *H04L 27/2634* (2013.01); *H04L 5/0053* (2013.01); *H04L 27/26* (2013.01);
(Continued)

(58) Field of Classification Search
CPC ... H04L 27/2634; H04L 5/0053; H04L 27/26; H04L 27/2636; H04L 72/0446; H04L 72/0453; H04L 5/0048
See application file for complete search history.

(56) References Cited

U.S. PATENT DOCUMENTS

2007/0195690 A1* 8/2007 Bhushan ............... H04L 5/0048
370/208
2010/0157953 A1* 6/2010 Christoffersson .........................
H04W 72/1294
370/336

(Continued)

FOREIGN PATENT DOCUMENTS

WO 2015099889 7/2015
WO WO-2015099889 A1 * 7/2015

OTHER PUBLICATIONS

Huawei, HiSilicon, "Discussion on New Frame Structure for latency Reduction in TDD" R1-160754, 3GPP TSG RAN WG1 Meeting #84, St. Julian's. Malta, Feb. 6, 2016, pp. 1-2 (Year: 2016).*
(Continued)

*Primary Examiner* — Ayaz R Sheikh
*Assistant Examiner* — Louis Samara
(74) *Attorney, Agent, or Firm* — Lee, Hong, Degerman, Kang & Waimey

(57) ABSTRACT

Disclosed are a method for transmitting and receiving, between a terminal and a base station, a control channel including control information, and a device for supporting the same. Particularly, disclosed in the present invention are: a method for transmitting and receiving a control channel, if a subcarrier spacing or fast Fourier transform (FFT) size of
(Continued)

the control channel including control information is different from the subcarrier spacing or FFT size of a data channel including data; and a device for supporting the same.

12 Claims, 16 Drawing Sheets

(52) U.S. Cl.
CPC ...... *H04L 27/2602* (2013.01); *H04L 27/2607* (2013.01); *H04L 27/2636* (2013.01); *H04W 72/0446* (2013.01); *H04W 72/0453* (2013.01); *H04L 5/0007* (2013.01); *H04L 5/0048* (2013.01); *H04W 72/0406* (2013.01)

(56) References Cited

U.S. PATENT DOCUMENTS

| | | | |
|---|---|---|---|
| 2012/0327855 A1* | 12/2012 | Lee | H04L 1/0072 370/328 |
| 2013/0028150 A1* | 1/2013 | Ma | H04L 27/2626 370/280 |
| 2013/0279614 A1 | 10/2013 | Walton et al. | |
| 2015/0180622 A1* | 6/2015 | Yoo | H04W 72/0446 370/330 |
| 2015/0181591 A1* | 6/2015 | Kishiyama | H04L 5/001 370/329 |
| 2019/0059075 A1* | 2/2019 | Hayashi | H04L 27/2602 |

OTHER PUBLICATIONS

PCT International Application No. PCT/KR2017/001255, Written Opinion of the International Searching Authority dated Apr. 25, 2017, 21 pages.

Huawei, et al., "Discussion on new frame structure for latency reduction in TDD", 3GPP TSG RAN WG1 Meeting #84, R1-160754, Feb. 2016, 10 pages.

Catt, "System Analysis of DL TTI Shortening", 3GPP TSG RAN WG1 Meeting #84, R1-160373, Feb. 2016, 8 pages.

* cited by examiner

METHOD FOR TRANSMITTING AND RECEIVING CONTROL CHANNEL IN WIRELESS COMMUNICATION SYSTEM AND DEVICE FOR SUPPORTING SAME

CROSS-REFERENCE TO RELATED APPLICATIONS

This application is the National Stage filing under 35 U.S.C. 371 of International Application No. PCT/KR2017/001255, filed on Feb. 6, 2017, which claims the benefit of U.S. Provisional Application No. 62/302,764, filed on Mar. 2, 2016, the contents of which are all hereby incorporated by reference herein in their entireties.

TECHNICAL FIELD

The following description relates to a wireless communication system, and more particularly to a method for transmitting and receiving uplink (UL) control information or downlink (DL) control information between a user equipment (UE) and a base station (BS), and devices for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention devised to solve the problem lies in a method for efficiently transmitting and receiving a control channel including control information between a user equipment (UE) and a base station (BS) (or eNB).

In particular, it is an object of the present invention to provide a method for simultaneously transmitting a control channel to UEs located in different beam directions by allowing an orthogonal frequency division multiplexing (OFDM) symbol length for a data channel including data to be different from an OFDM symbol length for a control channel including control information.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present invention provides a method and apparatuses for transmitting and receiving a control channel including control information between a user equipment (UE) and a base station (BS).

In accordance with one aspect of the present invention, a method for transmitting a control channel to a second device by a first device in a wireless communication system includes transmitting, by the first device, a data channel to the second device during a data period, and transmitting, by the first device, a control channel to the second device during a control period other than the data period, wherein a Fast Fourier Transform (FFT) size of the control channel is different from an FFT size of the data channel.

A length of a first orthogonal frequency division multiplexing (OFDM) symbol for the data channel may be longer than a length of a second OFDM symbol for the control channel.

The data period may correspond to the single first OFDM symbol and a length of a first cyclic prefix (CP) for the single first OFDM symbol. The control period may correspond to a plurality of second OFDM symbols and a length of a plurality of second CPs for the plurality of second OFDM symbols.

The length of the first CP length may be different from the length of the second CP length.

For example, the single second OFDM symbol may transmit any one of a reference signal (RS) and control information.

In another example, the single second OFDM symbol may transmit a reference signal (RS) and control information.

The reference signal (RS) and the control information may be 1-DM (Frequency Division Multiplexing)- or CDM (Code Division Multiplexing)-transmitted.

If the control channel is an uplink (UL) control channel, the first device is a user equipment (UE), and the second device is a base station (BS).

The data period and the control period may be transmitted through a single subframe, and the control period may be transmitted after lapse of the data period in a time domain.

The single subframe may comprise a downlink (DL) control period in which a downlink (DL) control channel is transmitted.

If the control channel is a downlink (DL) control channel, the first device is a base station (BS), and the second device is a user equipment (UE).

The data period and the control period may be transmitted through a single subframe, and the single subframe may comprise an uplink (UL) control period in which an uplink (UL) control channel is transmitted.

In accordance with another aspect of the present invention, a method for receiving a control channel from a second device by a first device in a wireless communication system includes receiving, by the first device, a data channel from the second device during a data period, and receiving, by the first device, a control channel from the second device during a control period other than the data period, wherein a Fast Fourier Transform (FFT) size of the control channel is different from an FFT size of the data channel.

In accordance with another aspect of the present invention, a second device for transmitting a control channel to a first device in a wireless communication system includes a transmitter, and a processor configured to operate by connecting to the transmitter, wherein the processor is configured to transmit a data channel to the first device during a data period, and transmit a control channel to the first device during a control period other than the data period, and a Fast Fourier Transform (FFT) size of the control channel is different from an FFT size of the data channel.

In accordance with another aspect of the present invention, a second device for receiving a control channel from a first device in a wireless communication system includes a receiver, and a processor configured to operate by connecting to the receiver, wherein the processor is configured to receive a data channel from the first device during a data period, and receive a control channel from the first device during a control period other than the data period, and a Fast Fourier Transform (FFT) size of the control channel is different from an FFT size of the data channel.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, a base station (BS) or a user equipment (UE) may perform time division of a control channel including control information, and may transmit the resultant control channel to different UEs. In more detail, the BS or UE may transmit the control channel to UEs located in different beam directions.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE

Figure 1:
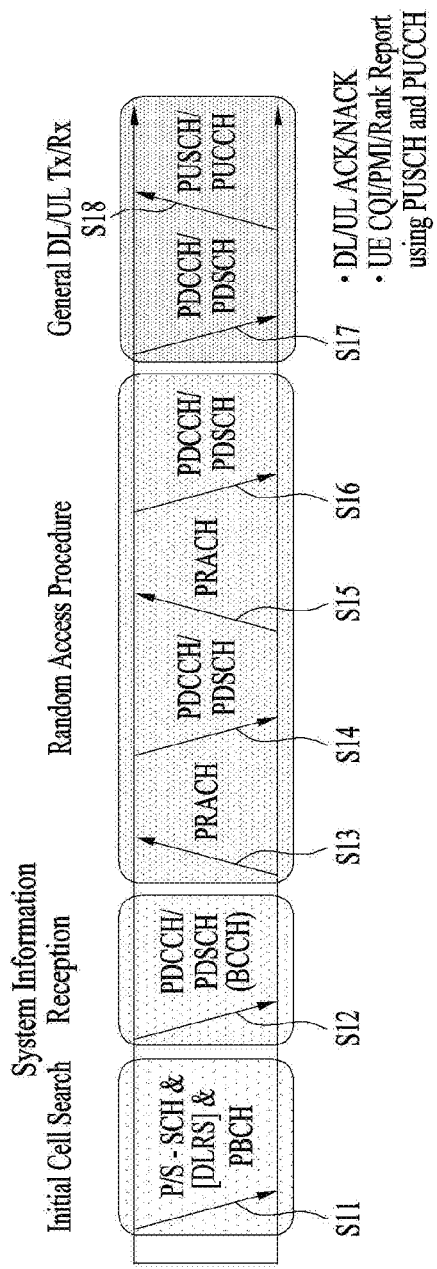
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
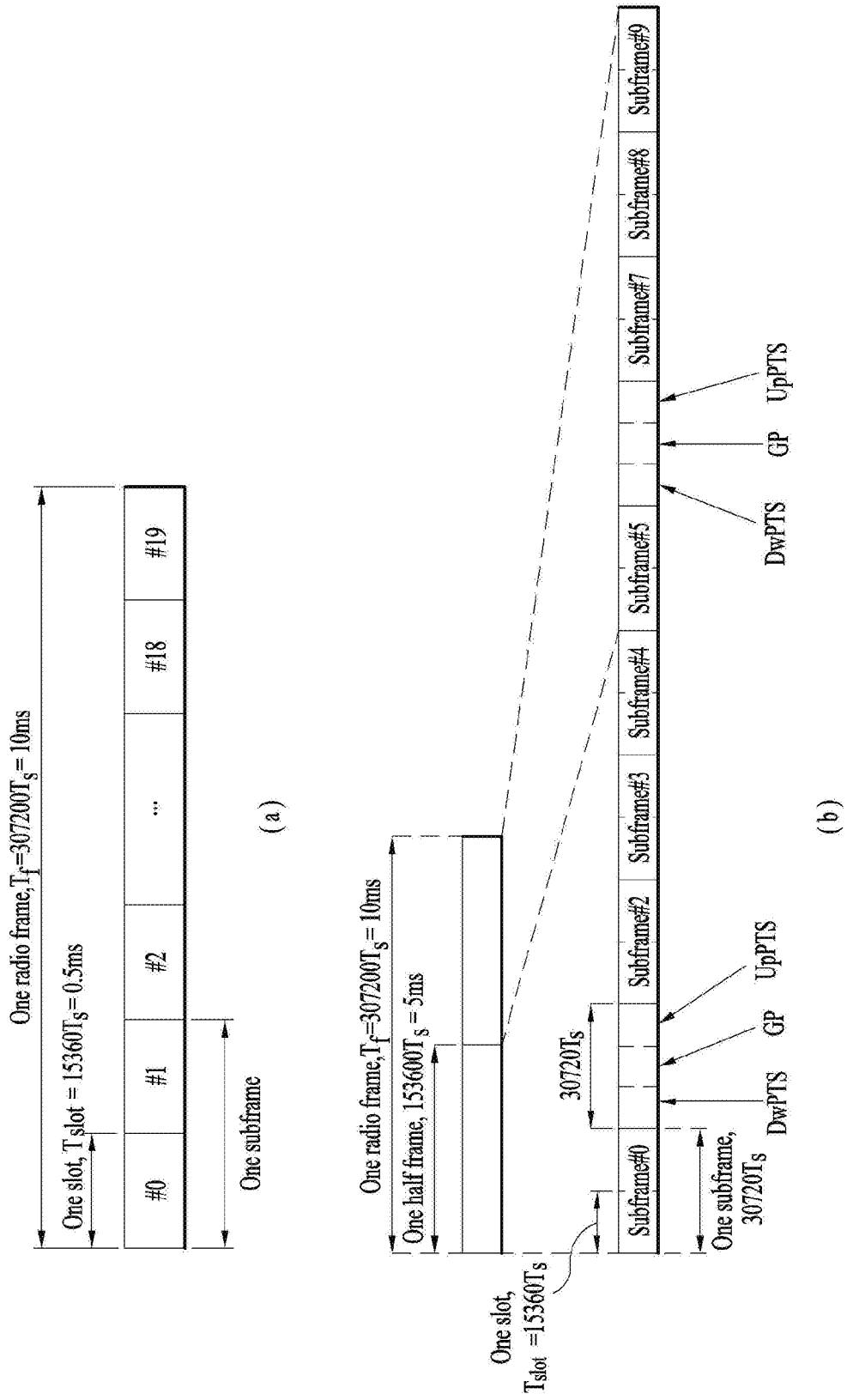
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since 01-DMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
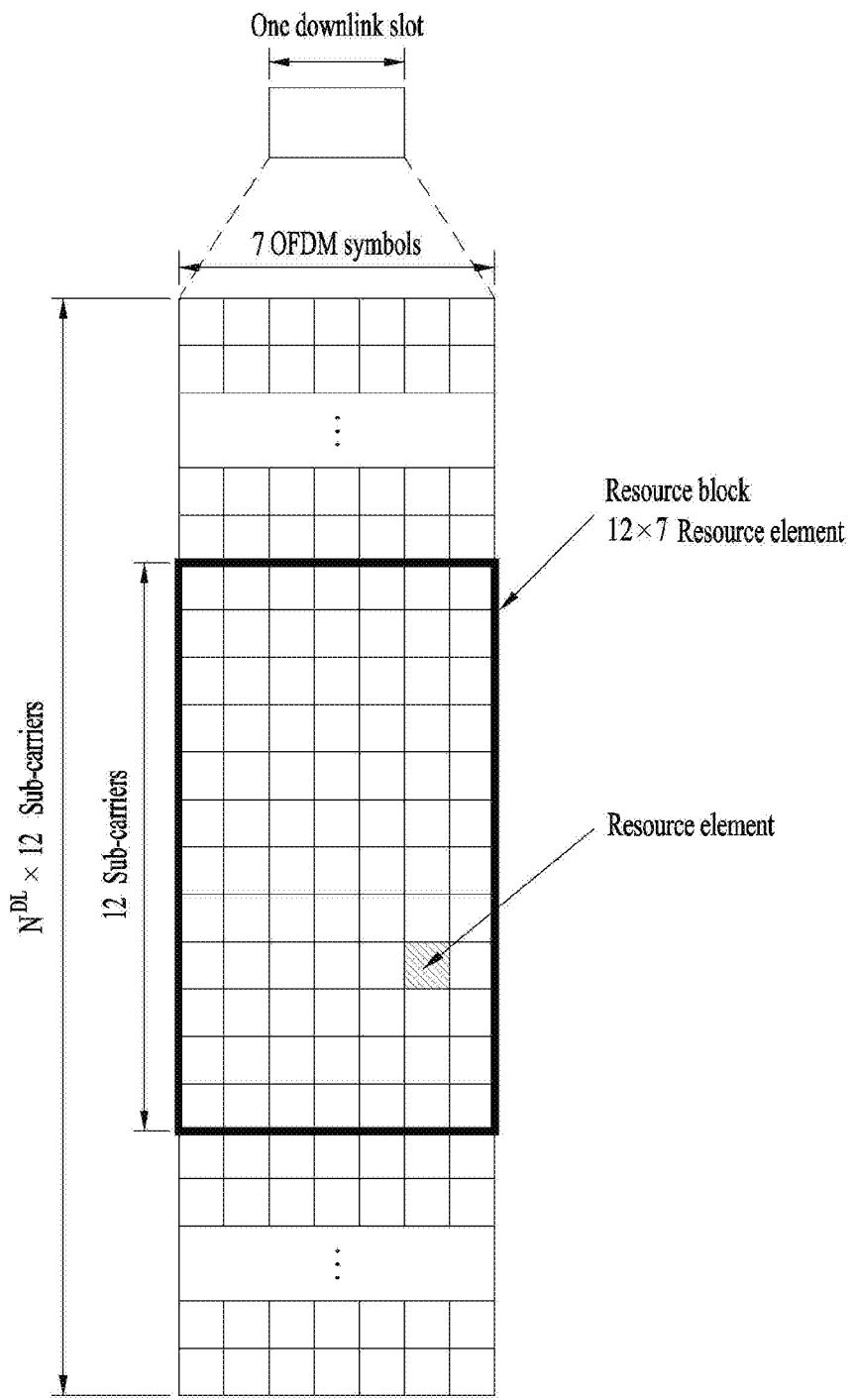
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
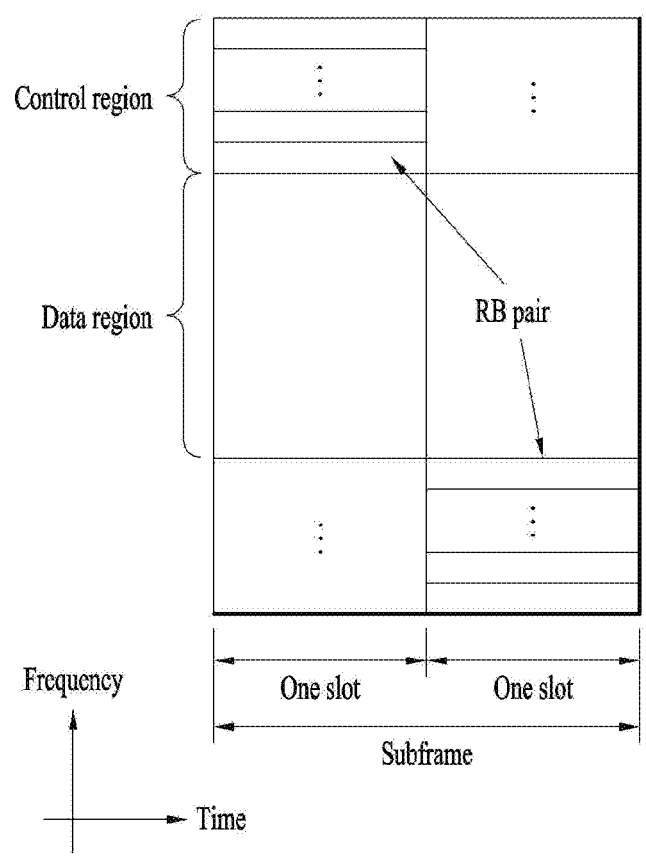
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
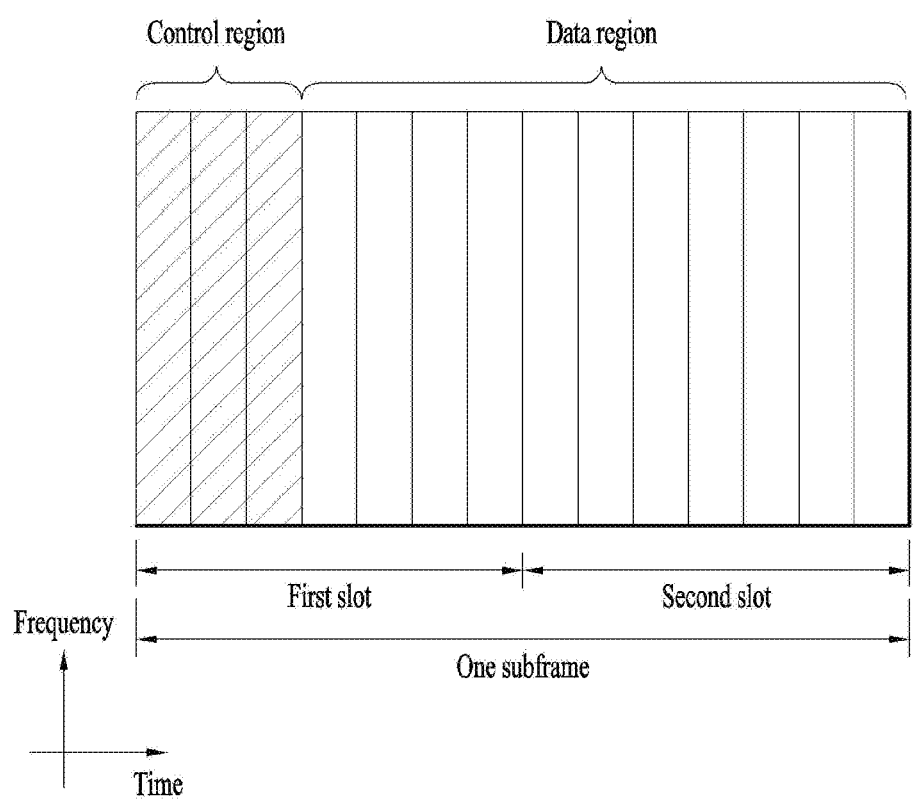
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As more and more communication devices require greater communication capacity, there is a need for mobile broadband communication enhanced over existing radio access technology (RAT). Massive Machine-Type Communications (MTC), which provides a variety of services by connecting multiple devices and objects anywhere and anytime, is also considered. In addition, communication system design considering services/UEs sensitive to reliability and latency is also under discussion.

Thus, introduction of a new radio access technology considering enhanced mobile broadband communication, massive MTC, and Ultra-Reliable and Low Latency Communication (URLLC) is being discussed. In the present invention, for simplicity, this technology will be referred to as New RAT.

2.1. Self-Contained Subframe Structure

Figure 6:
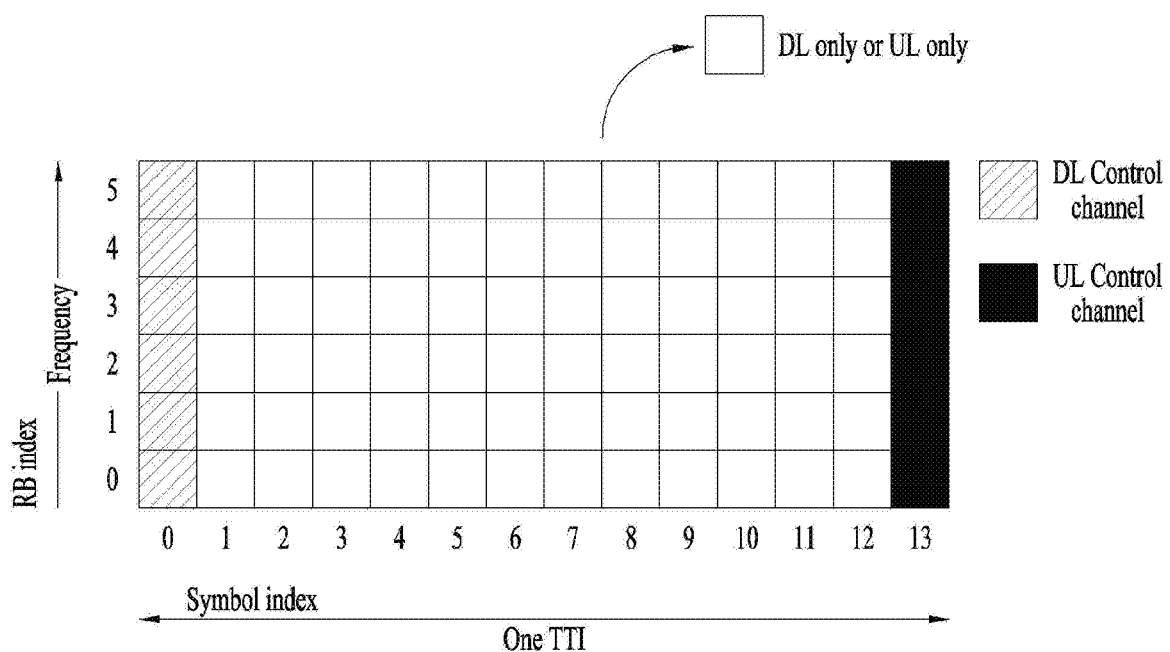
FIG. 6 is a diagram illustrating a self-contained subframe structure applicable to the present invention.

FIG. 6 is a diagram illustrating a self-contained subframe structure applicable to the present invention.

In the New RAT system to which the present invention is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain time length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone as shown in FIG. 6.

2.2. OFDM Numerology

The New RAT system uses the OFDM transmission scheme or a similar transmission scheme. Here, the New RAT system may typically have the OFDM numerology as shown in Table 2.

TABLE 2

| Parameter | Value |
|---|---|
| Subcarrier-spacing (Δf) | 75 kHz |
| OFDM symbol length | 13.33 μs |
| Cyclic Prefix(CP) length | 1.04 us/0.94 μs |
| System BW | 100 MHz |
| No. of available subcarriers | 1200 |
| Subframe length | 0.2 ms |
| Number of OFDM symbol per Subframe | 14 symbols |

Alternatively, the New RAT system may use the OFDM transmission scheme or a similar transmission scheme, and may use an OFDM numerology selected from among multiple OFDM numerologies as shown in Table 3. Specifically, as disclosed in Table 3, the New RAT system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the New RAT system according to the present invention, and the values thereof may vary depending on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 3 are merely an example that is applicable to the New RAT system according to the present invention, and the values thereof may vary depending on the implementation method.

TABLE 3

| Parameter | Value | Value | Value | Value |
|---|---|---|---|---|
| Subcarrier-spacing (Δf) | 15 kHz | 30 kHz | 60 kHz | 120 kHz |
| OFDM symbol length | 66.66 | 33.33 | 16.66 | 8.33 |

TABLE 3-continued

| Parameter | Value | Value | Value | Value |
| --- | --- | --- | --- | --- |
| Cyclic Prefix(CP) length | 5.20 μs/4.69 μs | 2.60 μs/2.34 μs | 1.30 μs/1.17 μs | 0.65 μs/0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

3. Proposed Embodiment

As described above, when analog (or hybrid) beamforming is used with millimeter waves (mmW), signals can be transmitted only in one beam direction (or in a small number of beam directions) at one time point. Therefore, a base station (BS) (or eNB) may transmit associated signals only to a small number of UEs located in the corresponding direction. In addition, even in the case where the BS receives a UL signal, it is possible to configure a single reception (Rx) beam direction (or a small number of beam directions), such that the BS may receive only signals transmitted from some UEs located in the corresponding direction.

In FIG. 6, data information is transmitted across a plurality of OFDM symbols, such that different beam directions can be applied to the respective OFDM symbols so as to support services for UEs located in different directions. However, since control information does not correspond to a large amount of information, there is a higher need to simultaneously provide services to UEs located in the different beam directions during a single OFDM symbol duration. Due to the above reason, the present invention provides a method for transmitting data (specifically, control information) by TDM/FDM-processing a single normal OFDM symbol duration.

3.1 First Scheme

A first scheme according to the present invention provides a method for allowing an OFDM symbol length for data information transmission to be different from an OFDM symbol length for control information transmission, thereby using different OFDM symbol lengths.

Figure 7:
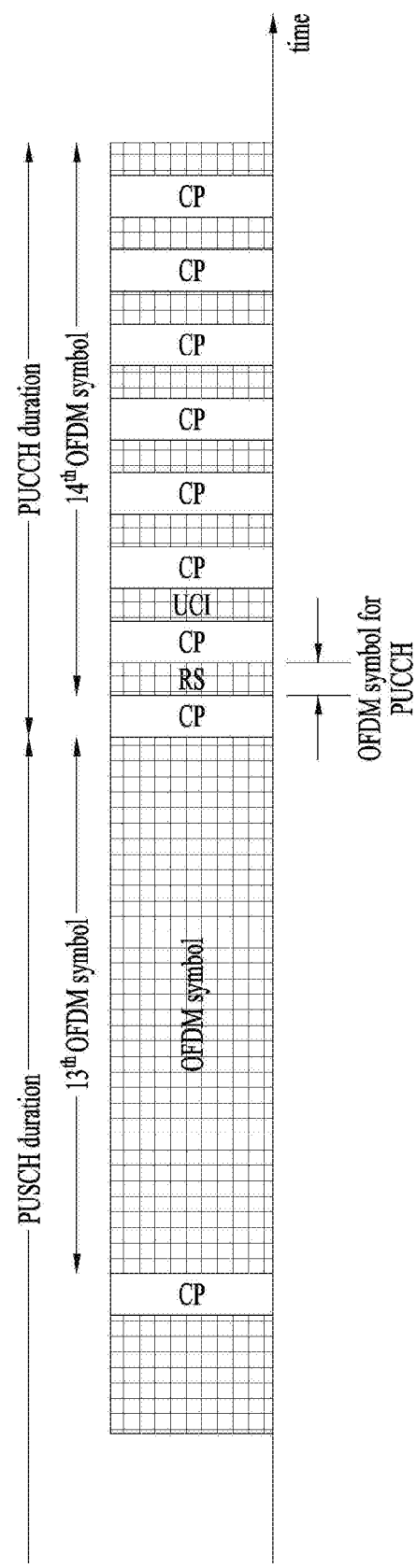
FIG. 7 is a diagram illustrating a method for transmitting UL control information according to a first scheme of the present invention.

FIG. 7 is a diagram illustrating a method for transmitting UL control information according to a first scheme of the present invention;

FIG. 7 illustrates a time domain for the last 2 OFDM symbols in the subframe shown in FIG. 6. In more detail, FIG. 7 illustrates an example in which an OFDM symbol for PUSCH for transmitting data on uplink (UL) is 16 times longer than an OFDM symbol for PUCCH for transmitting control information on uplink (UL).

In FIG. 7, a PUSCH transmission (Tx) region (PUSCH duration) comprises a normal OFDM symbol having a length of 2048 samples and a Cyclic Prefix (CP) composed of 144 samples. The PUCCH transmission region (PUCCH duration) comprises a shortened OFDM symbol having 128 samples and a CP having 144 (or 160) samples. In order to establish 2192 (=144+2048) samples corresponding to a normal OFDM symbol length having the CP within the PUSCH transmission region (PUSCH duration), the CP length to be added (or to be additionally allocated) to each shortened OFDM symbol of the PUCCH transmission region may be changed, such that different CP lengths may be allocated to the respective shortened OFDM symbols.

For example, the CP added to a first shortened OFDM symbol has a length of 160 samples, and the CP added to each of the remaining shortened OFDM symbols has a length of 144 samples.

Although FIG. 7 illustrates an exemplary case in which the last (one) normal OFDM symbol of the subframe includes (or is divided into) a plurality of shortened OFDM symbols for convenience of description, the normal OFDM symbol based on the example of FIG. 7 may also be modified into a plurality of normal OFDM symbols as necessary. For example, if there is a large amount of control information to be transmitted, a plurality of normal OFDM symbols located in the latter half of the subframe may also be divided into a plurality of shortened OFDM symbols for control information transmission.

FIG. 7 illustrates an example in which a reference signal (RS) and uplink control information (UCI) are transmitted from different shortened OFDM symbols so as to transmit control information. In addition, according to another example applicable to the present invention, RS and UCI may also be FDM- or CDM-transmitted in the same shortened OFDM symbol as necessary.

3.2 Second Scheme

The method for transmitting UL control information using the shortened OFDM symbol according to the first scheme may also be applied to a method for transmitting downlink control information (DCI) on downlink (DL).

Figure 8:
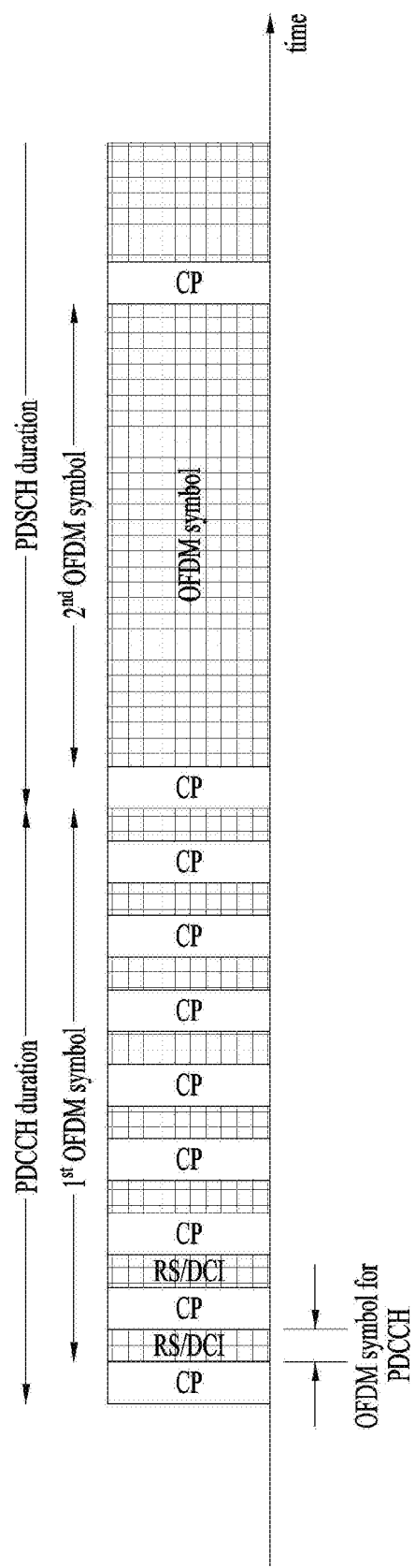
FIG. 8 is a diagram illustrating a method for transmitting DL control information according to a second scheme of the present invention.

FIG. 8 is a diagram illustrating a method for transmitting DL control information according to a second scheme of the present invention.

FIG. 8 illustrates a time domain of the length of first 2 OFDM symbols in the subframe shown in FIG. 6. In more detail, FIG. 8 illustrates an example in which an OFDM symbol for PUSCH for transmitting data on downlink (DL) is 16 times longer than an OFDM symbol for PUCCH for transmitting control information on downlink (DL).

According to the second scheme, when there is a large amount of control information to be transmitted on downlink (DL), a plurality of normal OFDM symbols located at the first part of the subframe may be divided into a plurality of shortened OFDM symbols in the same manner as in the first scheme. In this case, RS and DCI may be TDM-transmitted in different shortened OFDM symbols, or may be FDM- or CDM-transmitted in the same shortened OFDM symbols.

In this case, a UE may receive in advance specific information as to which shortened OFDM symbol is used to transmit DCI to be transmitted to the UE from a base station (BS) through RRC signaling. Alternatively, the UE may determine the position of the corresponding scheduled transmission (Tx) resources according to specific information as to which shortened OFDM symbol is used for DCI transmission, or may determine the position of the allocated (or granted) PUSCH Tx resources corresponding to the PDSCH Tx resources.

Figure 9:
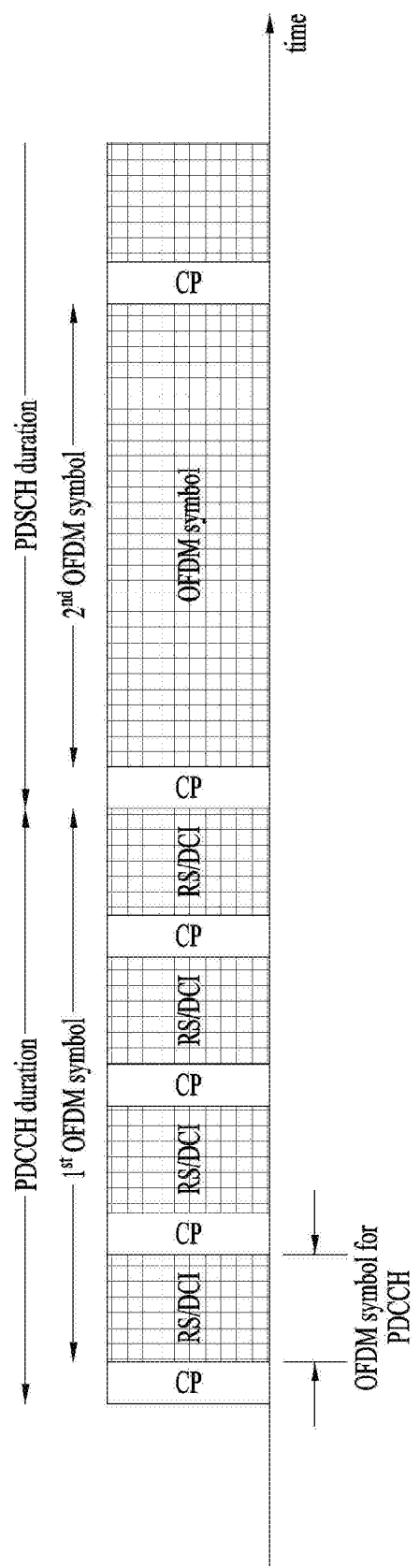
FIG. 9 is a diagram illustrating a time duration of the length of first two OFDM symbols for use in a subframe shown in FIG. 6, and illustrates an example in which an OFDM symbol for PDSCH for transmitting data on downlink (DL) is four times longer than an OFDM symbol for PDCCH for transmitting control information on downlink (DL)

FIG. 9 is a diagram illustrating a time duration of the length of first two OFDM symbols in the subframe shown in FIG. 6, and illustrates an example in which an OFDM symbol for PDSCH for transmitting data on downlink (DL) is four times longer than an OFDM symbol for PDCCH for transmitting control information on downlink (DL).

In FIG. 9, the PDSCH transmission region (PDSCH duration) includes a normal OFDM symbol having a length of 2048 samples and a Cyclic Prefix (CP) composed of 144 samples. The PDCCH transmission region (PDCCH duration) includes a shortened OFDM symbol having 512 samples and a CP having 208 (or 255) samples. In this case, if a normal OFDM symbol is composed of 1200 subcarriers, a shortened OFDM symbol is composed of fewer than 300 subcarriers.

FIGS. 8 and 9 illustrate that the shortened OFDM symbol has a length of 128 samples, and illustrate the examples in which the shortened OFDM symbol length having 128 samples is 1/16 times the normal OFDM symbol length having 2048 samples. As a modified example of FIGS. 8 and 9, the BS or UE may divide the time domain of the normal OFDM symbol including the CP into various sizes of shortened OFDM symbols, and may then transmit the divided shortened OFDM symbols.

TABLE 4

| Shortened OFDM symbol length (Ns) | Number of shortened OFDM symbols | CP overhead [%] |
|---|---|---|
| 1024 | 1 | 53% |
| 512 | 3 | 30% |
| 256 | 5 | 42% |
| 128 | 8 | 53% |
| 64 | 10 | 71% |
| 32 | 12 | 82% |
| 16 | 13 | 91% |
| 8 | 14 | 95% |

Table 4 illustrates the number of shortened OFDM symbols capable of being transmitted during 2192 samples corresponding to the normal OFDM symbol length having a CP in the scheme for establishing the CP length for the shortened OFDM symbol to be similar to the CP length for the normal OFDM symbol. For example, if the shortened OFDM symbol length is denoted by Ns, the number of shortened OFDM symbols may be denoted by "floor(2192/(Ns+144))". In this case, floor(X) is a maximum integer less than or equal to 'X'. In this case, the remaining samples may be used to increase the CP length up to 144 or higher.

In another example, the CP length for the shortened OFDM symbol may be shorter than or longer than the CP length for the normal OFDM symbol, differently from the scheme applied to Table 4. Specifically, according to the shortened OFDM symbol transmission scheme as shown in the last column of Table 4, CP overhead is at a high level, a modulation order of control information is at a low modulation order and the control information has high robustness against inter-symbol interference (ISI), such that it may be preferable that the CP length for the shortened OFDM symbol be shorter than that of a general case.

In Table 5, when the CP length for the shortened OFDM symbol is equal to or higher than 72, the number of shortened OFDM symbols capable of being transmitted during 2192 samples is denoted by 'floor(2192/(Ns+72))', and a detailed description thereof is as follows.

TABLE 5

| Shortened OFDM symbol length (Ns) | Number of shortened OFDM symbols | CP overhead [%] |
|---|---|---|
| 1024 | 2 | 7% |
| 512 | 3 | 30% |
| 256 | 6 | 30% |
| 128 | 10 | 42% |
| 64 | 16 | 53% |
| 32 | 21 | 69% |
| 16 | 24 | 82% |
| 8 | 27 | 90% |

In Tables 4 and 5, the CP overhead may increase in inverse proportion to the length of the shortened OFDM symbol. That is, as the shortened OFDM symbol Tx time is reduced, the BS may transmit and receive control information to and from several UEs located in different beam directions using many more divided time periods. However, the CP overhead of the BS increases, such that overall fabrication efficiency may be deteriorated.

Therefore, a scheme for establishing the length of a short OFDM symbol according to traffic types and the number and distribution of UEs to be serviced by the BS may be used. In addition, a scheme for establishing the CP length to be added to the shortened OFDM symbol in consideration of a maximum delay time of a multi-path fading channel may also be used.

The BS may inform the UE of the length of a shortened OFDM symbol to be used for PDCCH transmission through a master information block (MIB). In addition, the BS may also inform the UE of the CP length to be added to the shortened OFDM symbol through the MIB.

Alternatively, available combination sets of the CP length and the shortened OFDM symbol length may be promised between the BS and the UE in advance, and the BS may inform the UE of information as to which combination was used through the MIB in a cell association process.

Alternatively, the BS may designate the number and length of shortened OFDM symbols to be transmitted for a specific time period, and may inform the UE of the designated number and length of shortened OFDM symbols, such that the UE may calculate the CP length to be added to each shortened OFDM symbol. In this case, some parameters may be promised between the BS and the UE in advance.

In the beam scanning step of the cell association process, the BS may inform the UE of information as to which directional beam is scheduled to use which shortened OFDM symbol provided with PDCCH and PUCCH. Therefore, the UE may receive DCI in a PDCCH region of the shortened OFDM symbol corresponding to a beam ID selected using the above-mentioned information.

In another example, the BS may inform the UE of not only the set of a subframe in which PDCCH is transmitted through the shortened OFDM symbol, but also parameters for transmitting the shortened OFDM symbol through RRC signaling. The UE assumes that PDCCH is transmitted through the shortened OFDM symbol in a DL control region of a corresponding subframe set and PDCCH is transmitted through a normal OFDM symbol in the remaining subframes other than the corresponding subframe, such that the UE attempts to detect DCI based on the above assumption.

In more detail, the BS may allow the OFDM symbol length used for PDCCH transmission to be configured in different ways according to a common PDCCH through which common control information is transmitted and a dedicated PDCCH through which dedicated control information is transmitted. For example, a common PDCCH may be transmitted through a normal OFDM symbol, and the dedicated PDCCH may be transmitted through a shortened OFDM symbol. In this case, the subframe through which the common PDCCH is transmitted is designated in advance, such that the UE may attempt to perform blind detection (BD) of a common PDCCH having PDSCH scheduling information accompanied by a system information block (SIB) in the corresponding subframe. Through the above operations, the UE may acquire SIB information. The BS may inform the UE of not only specific information as to which CP length is used for dedicated PDCCH transmission to SIB, but also other information as to whether the dedicated PDCCH having the shortened OFDM symbol length is transmitted to SIB.

As a modified example of the above example, the UE may receive any one of a common search space (CSS) and a UE-specific search space (USS) as a search space to be used for blind detection (BD) for PDCCH. In this case, PDCCH of CSS may be transmitted through the normal OFDM symbol, and PDCCH of USS may be transmitted through the shortened OFDM symbol. In this case, the BS may inform the UE of the CP length and the shortened OFDM symbol length that are scheduled to be used for PDCCH transmitted in the USS through RRC signaling that is transmitted through PDSCH scheduled by PDCCH transmitted in the CSS.

The BS may inform the UE of a shortened OFDM symbol length used for PUCCH transmission and a CP length for the shortened OFDM symbol length through a master information block (MIB) in the same manner as in PDCCH. Alternatively, the BS may inform the UE of a shortened OFDM symbol length used for PUCCH transmission and the CP length for the shortened OFDM symbol length in a process for configuring the UL control channel Even in the case of PUCCH, available combination sets of a shortened OFDM symbol length and the CP length for the shortened OFDM symbol length may be promised between the BS and the UE in advance, and the BS may inform the UE of information as to which combination is used through RRC signaling in a process for configuring a control channel. Alternatively, the BS may designate the length and number of shortened OFDM symbols of PUCCH transmitted during a specific time period, and may inform the UE of the designated length and number of shortened OFDM symbols. The UE may calculate the CP length to be added to each shortened OFDM symbol using the above information. In this case, some parameters may be promised between the BS and the UE in advance.

In addition, the BS may inform the UE of not only the set of subframes in which PUCCH is transmitted through the shortened OFDM symbol, but also the aforementioned parameters needed for transmission of the shortened OFDM symbol, through RRC signaling. In this case, the above-mentioned information may also be transmitted through RRC signaling.

The UE may transmit PUCCH to the shortened OFDM symbol in the corresponding subframe set, and may transmit PUCCH to the normal OFDM symbol in the remaining subframes other than the corresponding subframe set.

Figure 10:
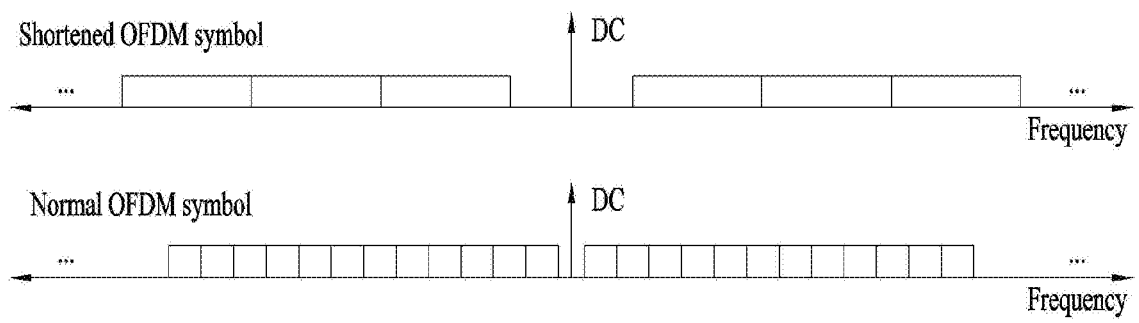
FIG. 10 illustrates the positions of subcarriers of DL shortened OFDM symbols according to an embodiment of the present invention.

FIG. 10 illustrates the positions of subcarriers of DL shortened OFDM symbols according to an embodiment of the present invention.

In more detail, FIG. 10 shows that, when the shortened OFDM symbol length is ¼ times the normal OFDM symbol length, subcarrier spacing in a frequency domain and a relative position of each OFDM resource element (RE) in the frequency domain. In this case, subcarrier spacing may refer to a spacing between contiguous subcarriers, and the subcarrier spacing value may technically correspond to an inverse number of an OFDM symbol length. In other words, FIG. 10 shows an example in which, when a subcarrier spacing of the normal OFDM symbol is denoted by $\Delta f$, a subcarrier spacing of the shortened OFDM symbol is four times longer than the subcarrier spacing $\Delta f$ of the normal OFDM symbol such that the subcarrier spacing of the shortened OFDM symbol is denoted by $4 \cdot \Delta f$. In this case, FIG. 10 shows an example in which a resource element (RE) is not allocated to a subcarrier corresponding to direct current (DC) of baseband processing in a similar way to DL of the LTE system.

Figure 11:
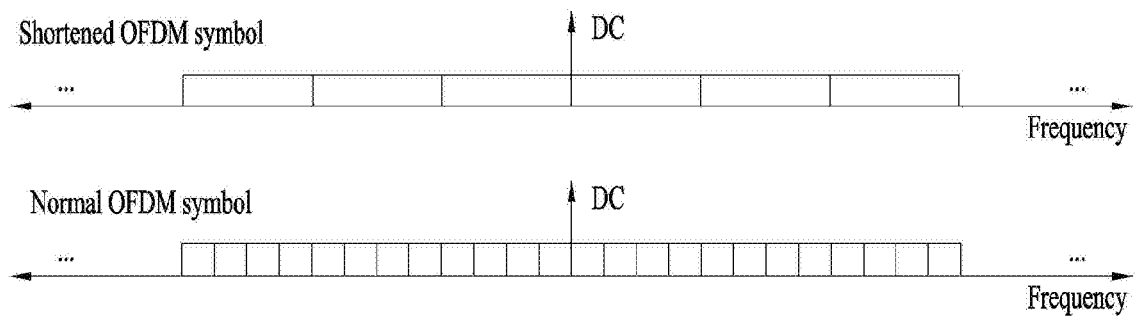
FIG. 11 illustrates the positions of subcarriers of UL shortened symbols according to an embodiment of the present invention.

FIG. 11 illustrates the positions of subcarriers of UL shortened symbols according to an embodiment of the present invention.

Referring to FIG. 11, when using a shortened OFDM symbol for use in the scheme for shifting a subcarrier of a normal OFDM symbol by $\Delta f/2$, and then transmitting the shifted subcarrier in such a manner that DC carriers are located between contiguous subcarriers in a similar way to UL of the LTE system, the subcarrier spacing of the shortened OFDM symbol is increased by four times such that the subcarrier spacing of $4 \cdot \Delta f$ is used, and the subcarrier is shifted by $2 \cdot \Delta f$ and then transmitted.

3.3 Third Scheme

According to the scheme of the present invention, an information transmission (Tx) position at a Discrete Fourier Transform (DFT) input stage is changed according to the SC-OFDM transmission scheme, such that a reference signal (RS), control information, and Tx signals of UEs can be multiplexed. A detailed description thereof will hereinafter be given with reference to FIG. 12.

Figure 12:
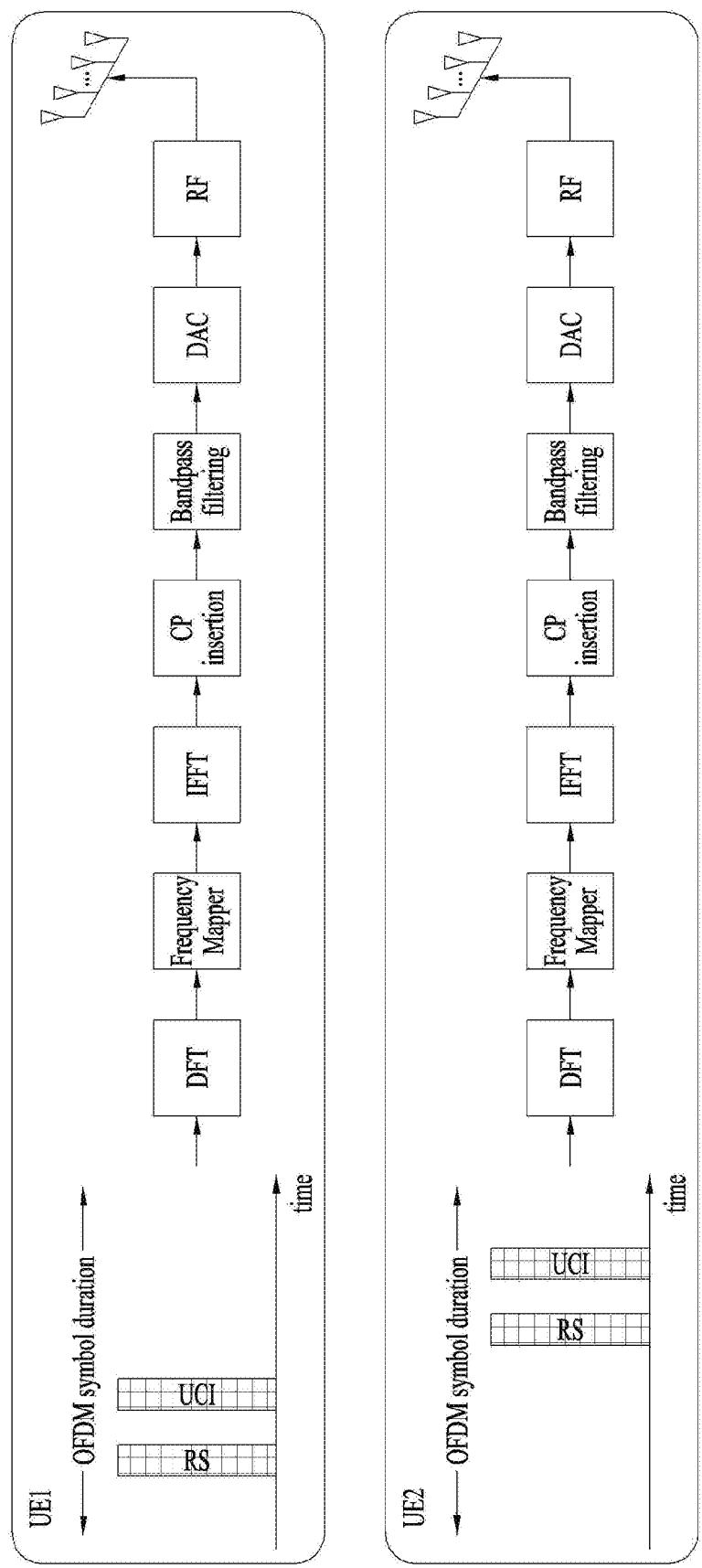
FIG. 12 is a conceptual diagram illustrating a method for TDM-transmitting control information according to a Single Carrier-Orthogonal Frequency Division Multiplexing (SC-OFDM) scheme.

FIG. 12 is a conceptual diagram illustrating a method for TDM-transmitting control information according to a Single Carrier-Orthogonal Frequency Division Multiplexing (SC-OFDM) scheme.

Referring to FIG. 12, an input signal according to the SC-OFDM transmission scheme may be DFT-processed to be mapped to a frequency axis, and may be Inverse Fast Fourier Transform (IFFT)-converted to be generated as a time-axis signal. That is, the signal of the DFT input stage may be regarded as a time-axis signal prior to oversampling.

Thus, the SC-OFDM transmission scheme of FIG. 12 may refer to a signal transmission scheme for oversampling a time-axis signal N/K times when a DFT size is set to K and the IFNT size is set to N, and then transmitting the resultant signal. Accordingly, the multiplexing scheme for performing multiplexing in different ways according to information Tx positions at the DFT input stage may be regarded as TDM. In this case, FIG. 12 shows an example in which UE1 and UE2 transmit signals using different sample positions for control information transmission at the DFT input stage.

In one example of FIG. 12, parameters for deciding resources of a control channel may include the amount and position of allocated frequency resources (i.e., the size and position of allocated subbands, and the amount and position of allocated time resources within the allocated subbands).

Here, the amount of allocated frequency resources may refer to the size K of DFT, and the position of allocated frequency resources may refer to the position of frequency resources of an IFFT input stage mapped to K samples of DFT output. The amount and position of allocated time resources within each of the allocated subbands may indicate how many samples from among K samples of DFT input have been allocated for control information transmission, and may also indicate the position of the allocated samples. Here, the amount and position of time resources for PUCCH transmission may be respectively designated for RS and UCI constructing the PUCCH.

As shown in FIG. 12, from among K samples of DFT input, no signals may be transmitted to the remaining samples other than the samples allocated to transmit control information of the corresponding UE. A guard sample may be configured between a sample for RS transmission and a sample for UCI transmission. The DFT size (K) may be limited to any of integers denoted by $2^a \times 3^b \times 5^c$, where a, b, and c are integers.

3.4 Fourth Scheme

The BS may dynamically designate resources of the allocated control channel per subframe through DCI, and may inform the UE of the designated resources. From among parameters for deciding such resources, some of the parameters may be configured through RRC signaling in advance, and only the remaining parameters may be dynamically designated through DCI. Thus, the fourth scheme of the present invention will disclose various examples for transmitting control information according to the SC-OFDM scheme. In this case, control information is transmitted through a control channel, such that it can be appreciated that control channel transmission methods are shown in the following drawings.

Figure 13:
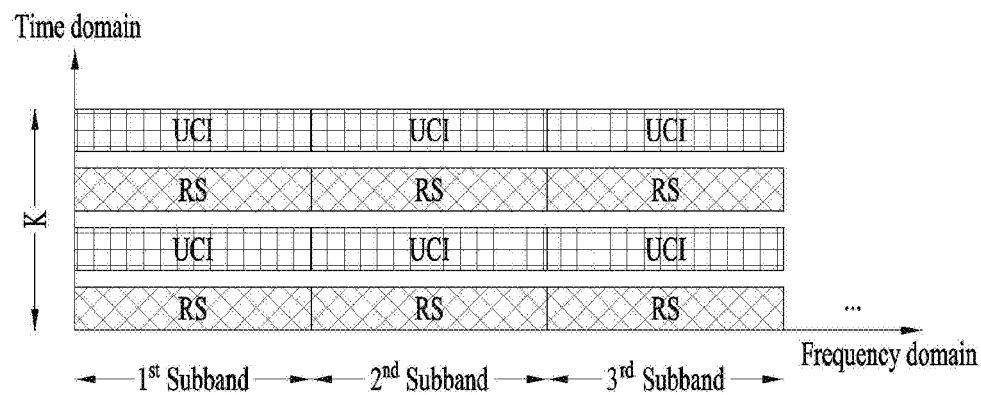
FIG. 13 is a conceptual diagram illustrating an example of a method for TDM/FDM-transmitting control information according to the SC-OFDM scheme.

FIG. 13 is a conceptual diagram illustrating an example of a method for TDM/FDM-transmitting control information according to the SC-OFDM scheme.

For example, as shown in FIG. 13, the size of subbands for PUCCH transmission may be promised between the UE and the BS in advance, or may be established by RRC signaling during a control channel setup process. In addition, a start position of samples allocated for control information transmission from among K samples of DFT input may be limited to (pre)determined positions. Specific information as to how many equal sub-durations will be obtained from K samples of DFT input and whether the resultant K samples will be TDM-processed according to the divided equal sub-durations may be prescribed between the UE and the BS, and may also be configured by RRC signaling during a control channel configuration process. In this case, through DCI, the BS may designate information indicating not only which subband will be used to transmit a control channel to the UE, but also which sub-duration will be used to transmit control information. In the example of FIG. 13, K samples are time-divided into two equal parts, and two UEs may transmit a PUCCH using the TDM scheme in the same subband.

Figure 14:
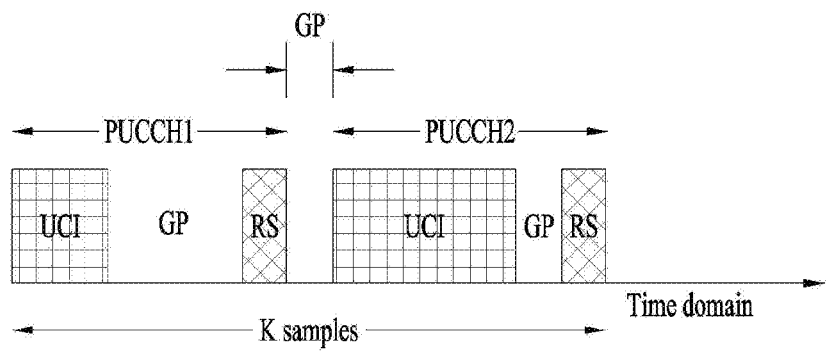
FIG. 14 is a conceptual diagram illustrating another example of a method for TDM-transmitting control information according to the SC-OFDM scheme.

FIG. 14 is a conceptual diagram illustrating another example of a method for TDM-transmitting control information according to the SC-OFDM scheme.

Although FIGS. 12 and 13 illustrate the examples in which RS of a PUCCH is transmitted earlier than UCI in the time domain for convenience of description, the scope or spirit of the present invention is not limited thereto, and UCI of a PUCCH may also be transmitted earlier than RS as shown in FIG. 14 in other examples applicable to the present invention. In this case, the spacing between the UCI start position and the RS start position of the same PUCCH may be fixed, and a scheme for inserting a necessary number of guard samples between the last sample of UCI and the first sample of RS according to the UCI length may be used. In order to transmit control information of other UEs using the TDM scheme, one pair of the RS transmission (Tx) region and the UCI Tx region may construct a single PUCCH, and a guard time may be configured between PUCCHs such that Inter-Sample Interference (ISI) between PUCCHs transmitted from other UEs can be mitigated.

Figure 15:
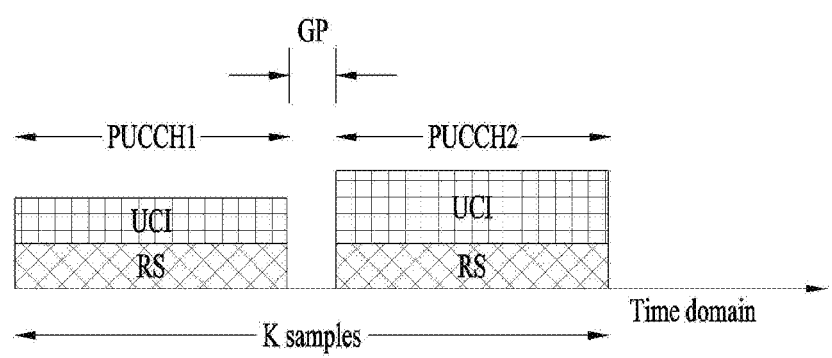
FIG. 15 is a conceptual diagram illustrating still another example of a method for TDM-transmitting control information according to the SC-OFDM scheme.

FIG. 15 is a conceptual diagram illustrating another example of a method for TDM-transmitting control information according to the SC-OFDM scheme.

Referring to FIG. 15, in another example of the present invention, RS and UCI of the same PUCCH may be CDM-transmitted in the time domain, and RSs and UCIs of different PUCCHs may be transmitted using the TDM scheme.

Figure 16:
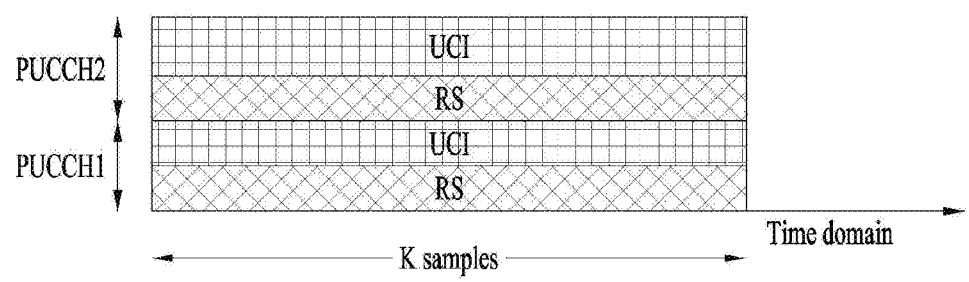
FIG. 16 is a conceptual diagram illustrating a method for CDM-transmitting control information according to the SC-OFDM scheme.

FIG. 16 is a conceptual diagram illustrating a method for CDM-transmitting control information according to the SC-OFDM scheme.

Referring to FIG. 16, according to still another example of the present invention, RS and UCI of the same PUCCH may be CDM-transmitted in the time domain, and RSs and UCIs of different PUCCHs may be transmitted using the CDM scheme.

Figure 17:
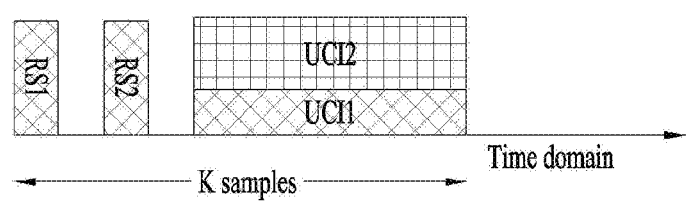
FIG. 17 is a conceptual diagram illustrating an example of a method for TDM/CDM-transmitting control information according to the SC-OFDM scheme.

FIG. 17 is a conceptual diagram illustrating an example of a method for TDM/CDM-transmitting control information according to the SC-OFDM scheme.

Referring to FIG. 17, according to still another example of the present invention, the TDM scheme may be applied between RSs of PUCCHs, and the CDM scheme may be applied between UCIs of PUCCHs, such that the resultant information can be transmitted. In more detail, as shown in FIG. 17, PUCCH1 may be composed of RS1 and UCI1, and PUCCH2 may be composed of RS2 and UCI2. In addition, as a modified example of FIG. 17, RS1 and RS2 may be CDM-transmitted, and UCI1 and UCI2 may be TDM-transmitted.

Figure 18:
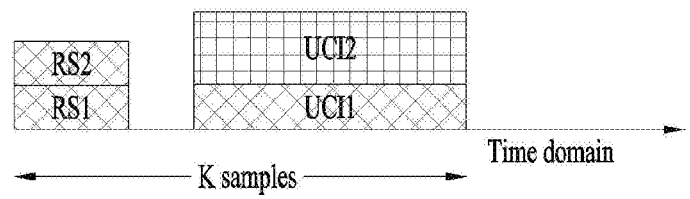
FIG. 18 is a conceptual diagram illustrating another example of a method for TDM/CDM-transmitting control information according to the SC-OFDM scheme.

FIG. 18 is a conceptual diagram illustrating another example of a method for TDM/CDM-transmitting control information according to the SC-OFDM scheme.

Referring to FIG. 18, RS and UCI may be TDM-processed, and the CDM scheme may be applied between PUCCHs, such that the resultant information is then transmitted.

Figure 19:
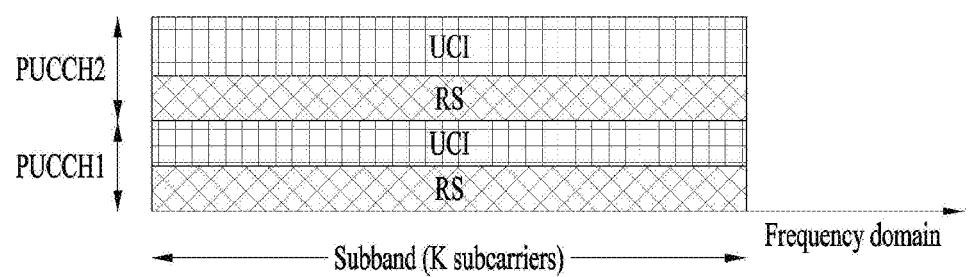
FIG. 19 is a conceptual diagram illustrating control information transmitted using the SC-OFDM scheme in a frequency domain according to an embodiment of the present invention.

FIG. 19 is a conceptual diagram illustrating control information transmitted using the SC-OFDM scheme in the frequency domain according to an embodiment of the present invention.

In the methods of FIGS. 14 to 18, the DFT-processed signal may be shown in the frequency domain as shown in FIG. 19. That is, RSs and UCIs of all PUCCHs transmitted in the same subband for use in the above-mentioned methods may be CDM-processed such that the resultant RSs and UCIs may overlap each other.

In this case, according to a method for forming a transmission (Tx) signal for control information, the UE may generate a transmission (Tx) signal from the format in which RS and UCI are CDM-processed in the frequency domain, without DFT conversion, as shown in FIG. 19. In this case, according to the TDM scheme of FIG. 14, the above-mentioned results are identical to those of the scheme for using a column vector of a DFT matrix as a spread sequence for CDM in the frequency domain.

If there is a large amount of UCI information to be transmitted from the UE, a plurality of PUCCHs may be allocated to one UE. In this case, although the plurality of allocated PUCCHs belongs to the same subband, it should be noted that the plurality of allocated PUCCHs may also be transmitted in different subbands. That is, the UE may receive a plurality of subbands and a plurality of sub-durations, and may transmit UCI having a large amount of information.

In summary, the present invention provides a method for establishing the OFDM symbol length for a control channel needed for control information transmission to be shorter than the OFDM symbol length of a data channel needed for data transmission. In other words, the present invention provides a structure in which a Fast Fourier Transform (FFT) size applied to the above control channel is different from an FFT size applied to the above data channel.

As the above-mentioned control channel, the UL control channel or the DL control channel may be used. Therefore, when the above control channel is a DL control channel, the BS may transmit a DL control channel as shown in FIG. 7, and the UE may receive the transmitted DL control channel as shown in FIG. 7. Alternatively, when the above control channel is an uplink (UL) control channel, the UE may transmit the UL control channel as shown in FIG. 8 or FIG. 9, and the BS may receive the transmitted UL control channel as shown in FIG. 8 or FIG. 9.

In this case, assuming that the OFDM symbol for the above control channel is referred to as a first OFDM symbol and the OFDM symbol for the above data channel is referred to as a second OFDM symbol, the first OFDM symbol may be longer than the second OFDM symbol.

In addition, the data period may correspond to the single first OFDM symbol and the first CP length for the single first OFDM symbol, and the control period may correspond to the plurality of second OFDM symbols and the second CP length for the second OFDM symbols. Specifically, the first CP length may be different from the second CP length.

In addition, as shown in FIGS. 7 to 9, the single second OFDM symbol may transmit any one of an RS (Reference Signal) and control information, or may simultaneously transmit the RS and the control information. If the single second OFDM symbol transmits the RS and the control information, the RS and the control information may be CDM-transmitted.

The above-mentioned control channel may be transmitted through the self-contained subframe structure shown in FIG. 6.

In more detail, if the above control channel is the UL control channel, the control period in which the above control channel is transmitted may be transmitted after lapse of the data period in the time domain. In this case, the control period and the data period may include a single subframe, and the single subframe may further include a DL control period in which the DL control channel is transmitted.

Alternatively, if the above control channel is the DL control channel, the above data period and the above control period may be transmitted through a single subframe, and the single subframe may further include a UL control period in which the UL control channel is transmitted.

4. Device Configuration

Figure 20:
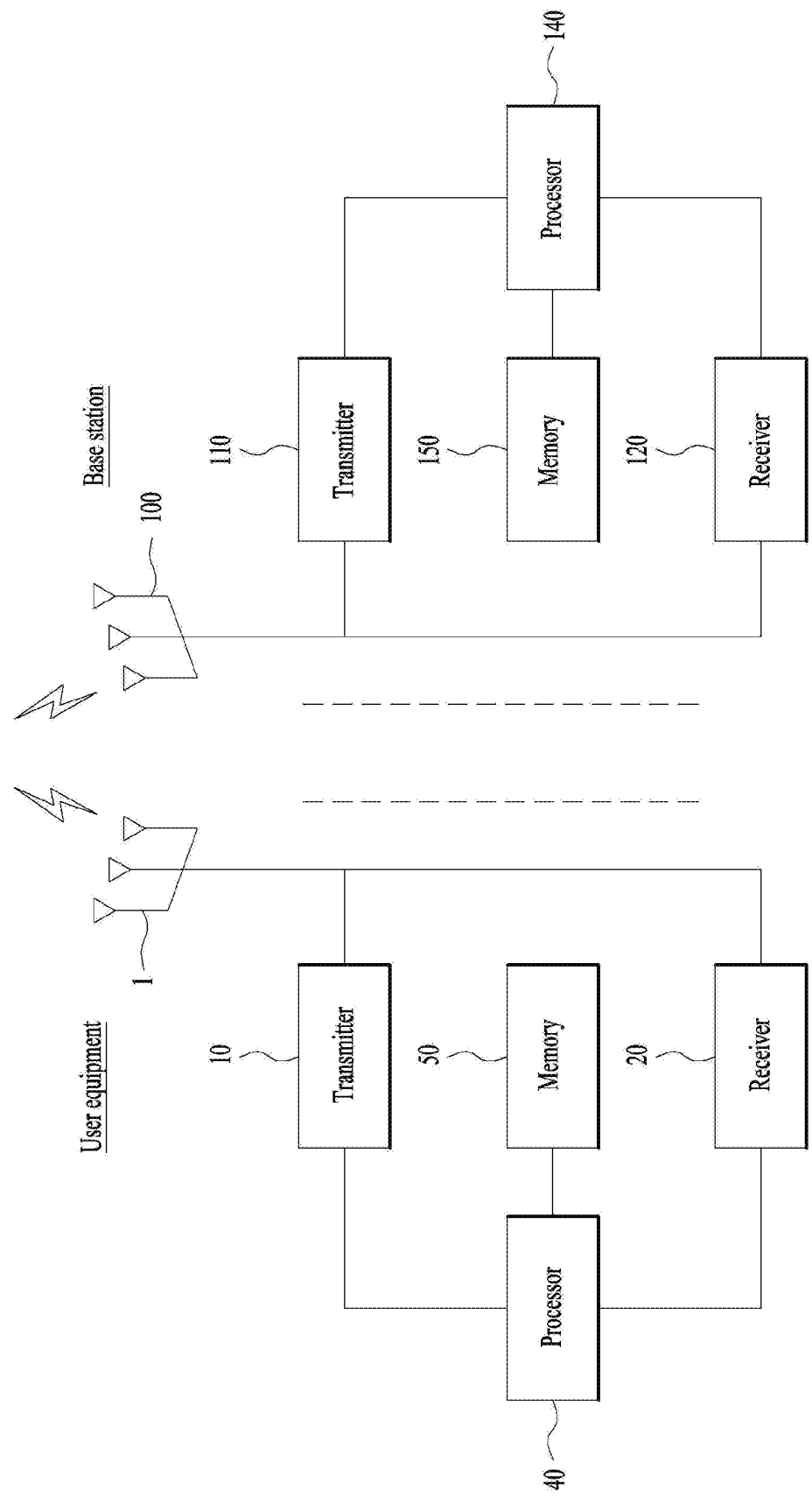
FIG. 20 is a diagram illustrating a configuration of a user equipment (UE) and a base station (BS) in which the proposed embodiments may be implemented.

FIG. 20 is a diagram illustrating configurations of a UE and a base station (BS) capable of being implemented by the embodiments proposed in the present invention. The UE and the base station (BS) shown in FIG. 20 operate to implement the embodiments of the method for transmitting and receiving a control channel between the UE and the BS.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The above-mentioned user equipment (UE) may receive first DL control information indicating whether the type of scheduling UL signal transmission for at least one subframe is first-type scheduling or second-type scheduling from the base station through the processor 40. If the first DL control information indicates the first-type scheduling, the UE may transmit the UL signal in at least one subframe configured based on the reception (Rx) time of the first DL control information. If the first DL control information indicates the second-type scheduling, the UE may receive the second DL control information for indicating UL signal transmission for the at least one subframe from the base station, and may transmit the UL signal in at least one subframe configured based on the Rx time of the second DL control information.

The above-mentioned base station (BS) may transmit first DL control information indicating whether the type of scheduling UL signal transmission for at least one subframe is first-type scheduling or second-type scheduling to the user equipment (UE) through the processor 140. If the first DL control information indicates the first-type scheduling, the base station (BS) may receive the UL signal in at least one subframe configured based on the transmission (Tx) time of the first DL control information. If the first DL control information indicates the second-type scheduling, the BS may transmit the second DL control information for indicating UL signal transmission for the at least one subframe to the user equipment (UE), and may receive the UL signal in at least one subframe configured based on the Tx time of the second DL control information.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 20 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2680 or 2690 and executed by the processor 2620 or 2630. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting a control channel to a base station by a user equipment in a wireless communication system, the method comprising:
   transmitting, by the user equipment, an uplink data channel to the base station during a data region; and
   transmitting, by the user equipment, an uplink control channel to the base station during a control region other than the data region,
   wherein a subcarrier spacing related to the uplink control channel is larger than a subcarrier spacing related to the uplink data channel.

2. The method according to claim 1, wherein a length of a first orthogonal frequency division multiplexing (OFDM) symbol for the uplink data channel is longer than a length of a second OFDM symbol for the uplink control channel.

3. The method according to claim 2, wherein:
   the data region includes a single first OFDM symbol and a length of a first cyclic prefix (CP) for the single first OFDM symbol; and
   the control region includes a plurality of second OFDM symbols and a length of a plurality of second CPs for the plurality of second OFDM symbols.

4. The method according to claim 3, wherein the length of the first CP is different from the length of the second CP.

5. The method according to claim 3, wherein a single second OFDM symbol transmits a reference signal (RS) or control information.

6. The method according to claim 3, wherein a single second OFDM symbol transmits a reference signal (RS) and control information.

7. The method according to claim 6, wherein the reference signal (RS) and the control information are multiplexed based on FDM (Frequency Division Multiplexing) or CDM (Code Division Multiplexing).

8. The method according to claim 1, wherein:
   the uplink data channel and the uplink control channel are transmitted through a single subframe; and
   the uplink control channel is transmitted after the uplink data channel in a time domain.

9. The method according to claim 8, wherein the single subframe comprises a downlink (DL) control region in which a downlink (DL) control channel is transmitted.

10. A method of receiving a control channel from a user equipment by a base station in a wireless communication system, the method comprising:
    receiving, by the base station, an uplink data channel from the user equipment during a data region; and
    receiving, by the base station, an uplink control channel from the user equipment during a control region other than the data region,
    wherein a subcarrier spacing related to the uplink control channel is larger than a subcarrier spacing related to the uplink data channel.

11. A user equipment for transmitting a control channel to a base station in a wireless communication system, the user equipment comprising:
    a transmitter; and
    a processor configured to operate by connecting to the transmitter,
    wherein the processor is configured to:
    transmit an uplink data channel to the base station during a data region, and
    transmit an uplink control channel to the base station during a control region other than the data region, and
    a subcarrier spacing related to the uplink control channel is larger than a subcarrier spacing related to the uplink data channel.

12. A base station for receiving a control channel from a user equipment in a wireless communication system, the base station comprising:

a receiver; and
a processor configured to operate by connecting to the receiver,
wherein the processor is configured to:
receive an uplink data channel from the user equipment during a data region, and
receive an uplink control channel from the user equipment during a control region other than the data region, and
a subcarrier spacing related to the uplink control channel is larger than a subcarrier spacing related to the uplink data channel.

\* \* \* \* \*